(12) United States Patent
Lindgren et al.

(10) Patent No.: US 7,899,255 B2
(45) Date of Patent: Mar. 1, 2011

(54) METHOD FOR RECOGNIZING AND INDEXING DIGITAL MEDIA

(75) Inventors: Ingvar Lindgren, Arsta (SE); Mikael Lowgren, Johanneshov (SE)

(73) Assignee: IMTT Svenska AB, Stockholm (SE)

( * ) Notice: Subject to any disclaimer, the term of this patent is extended or adjusted under 35 U.S.C. 154(b) by 876 days.

(21) Appl. No.: 11/815,585

(22) PCT Filed: Feb. 7, 2005

(86) PCT No.: PCT/US2005/003745
§ 371 (c)(1),
(2), (4) Date: Aug. 6, 2007

(87) PCT Pub. No.: WO2006/085861
PCT Pub. Date: Aug. 17, 2006

(65) Prior Publication Data
US 2008/0187229 A1    Aug. 7, 2008

(51) Int. Cl.
*G06K 9/48* (2006.01)
(52) U.S. Cl. .................. 382/199; 382/305; 707/E17.02
(58) Field of Classification Search .................. 382/199, 382/305; 707/E17.02
See application file for complete search history.

(56) References Cited

U.S. PATENT DOCUMENTS

| 4,888,812 A | 12/1989 | Dinan |
| 5,081,689 A | 1/1992 | Meyer et al. |
| 5,398,292 A * | 3/1995 | Aoyama ...................... 382/199 |
| 5,943,441 A * | 8/1999 | Michael ....................... 382/199 |
| 6,005,978 A * | 12/1999 | Garakani ..................... 382/218 |
| 6,665,439 B1 | 12/2003 | Takahashi |
| 6,674,906 B1 * | 1/2004 | Han et al. ................... 382/199 |
| 7,046,837 B2 * | 5/2006 | Guest et al. ................. 382/145 |

OTHER PUBLICATIONS

Dron, Lisa A. "Focal Plane Array Edge Detection Process Implementing the Multi-Scale Veto Algorithm," IEEE Journal of solid state circuits, Sep. 1996: vol. 31, No. 9.

* cited by examiner

*Primary Examiner*—Bhavesh M Mehta
*Assistant Examiner*—Stephen R Koziol
(74) *Attorney, Agent, or Firm*—Young & Thompson

(57) ABSTRACT

The method is for recognizing and indexing a digital image. The digital image is converted to a gray-scaled image. A first pixel value of a first pixel, a second pixel value of a second pixel and a third value of a third pixel are identified. A first difference between the first pixel value and the second pixel value and a second difference between the second pixel value and the third pixel value are determined. The first difference is compared with the second difference. A number of occurrences of each pixel difference are determined. A threshold difference is identified that corresponds to a dynamic threshold value of the number of occurrences. Each difference that is greater than the threshold difference is determined to be an edge pixel.

11 Claims, 2 Drawing Sheets

METHOD FOR RECOGNIZING AND INDEXING DIGITAL MEDIA

PRIOR APPLICATION

This application is a U.S. national phase application based on International Application No. PCT/US2005/003745, filed 7 Feb. 2005.

TECHNICAL FIELD

The method of the present invention relates to recognizing and indexing digital media.

All digital media is converted to digital images and is hereafter referred as images and is treated in that way.

BACKGROUND OF INVENTION

It is often difficult to organize and structure large picture files so that the images are easy to find. One big problem is to find the name of pictures particularly if the original organization has been changed. Prior methods have relied on bar codes or fingerprints on the picture. One drawback of the conventional techniques is that the pictures must go through a process to mark the picture so that it can be found later. This can be cumbersome. There is a need for a more effective method of recognizing and organizing pictures.

SUMMARY OF INVENTION

The method of the present invention provides a solution to the above-captioned problem. More particularly, the method is for recognizing and indexing a digital image. The digital image is converted to a gray-scaled image. A first pixel value of a first pixel, a second pixel value of a second pixel and a third value of a third pixel are identified. A first difference between the first pixel value and the second pixel value and a second difference between the second pixel value and the third pixel value are determined. The first difference is compared with the second difference. A number of occurrences of each pixel difference are determined. A threshold difference is identified that corresponds to a dynamic threshold value of the number of occurrences. Each difference that is greater than the threshold difference is determined to be an edge pixel.

DETAILED DESCRIPTION

Figure 1:
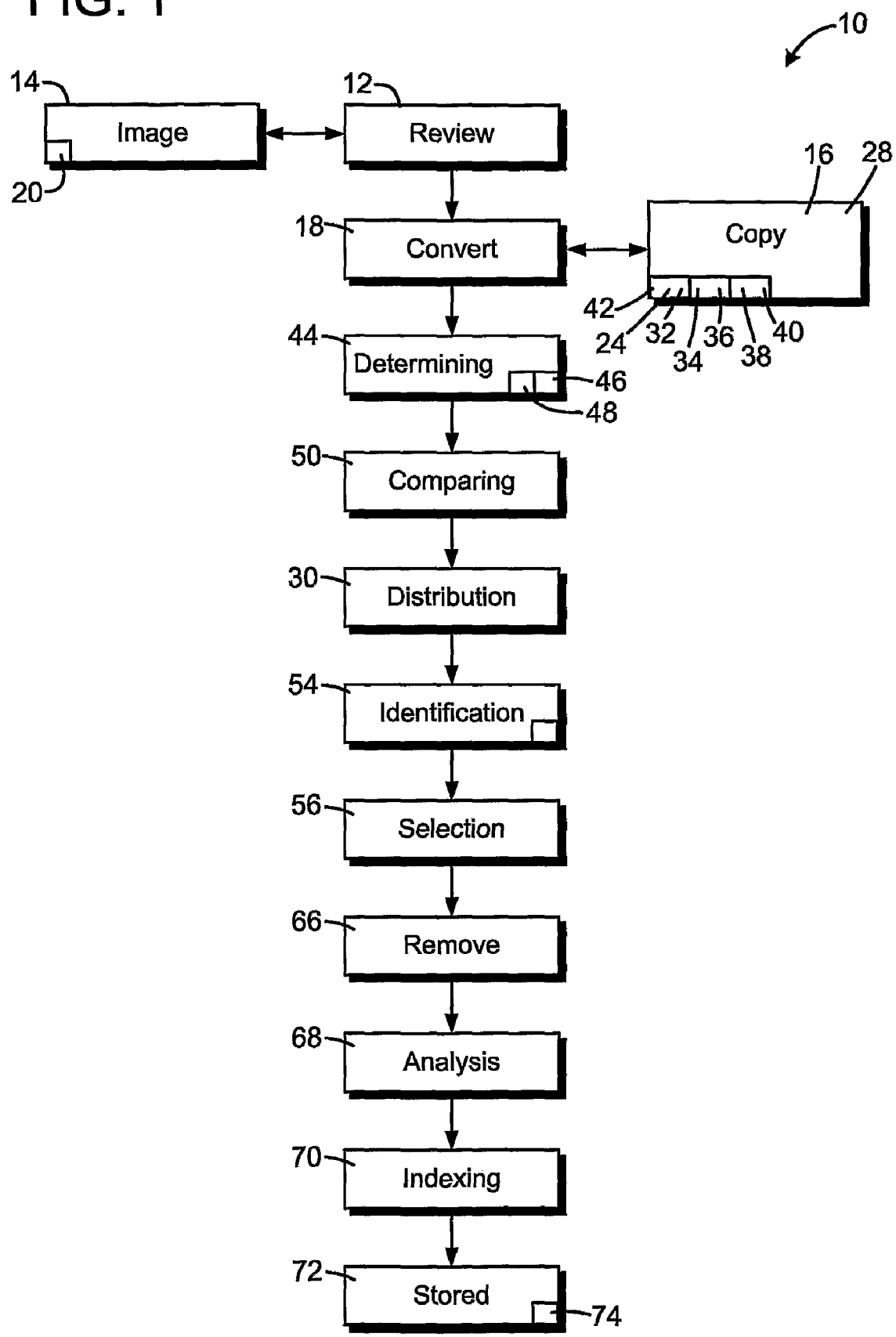
FIG. 1 is a schematic flow diagram of the method of the present invention.
Figure 2:
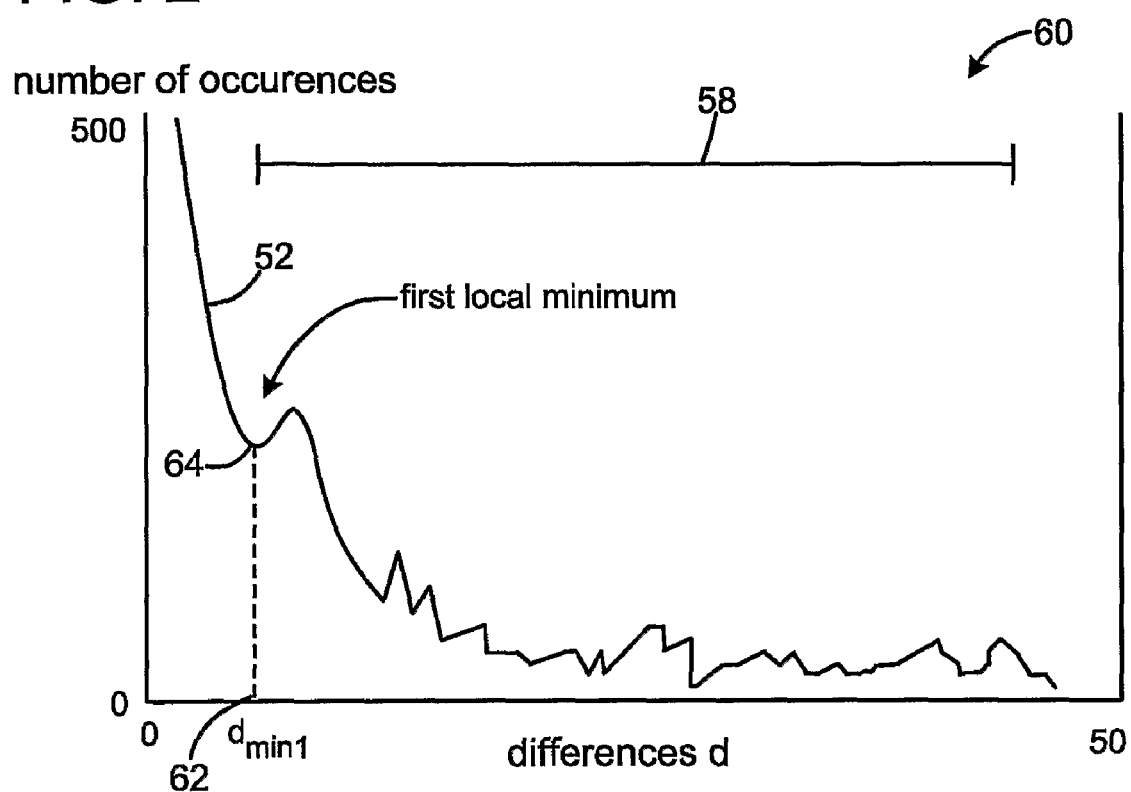
FIG. 2 is a graphical illustration of a distribution according to the method of the present invention.
Figure 3:
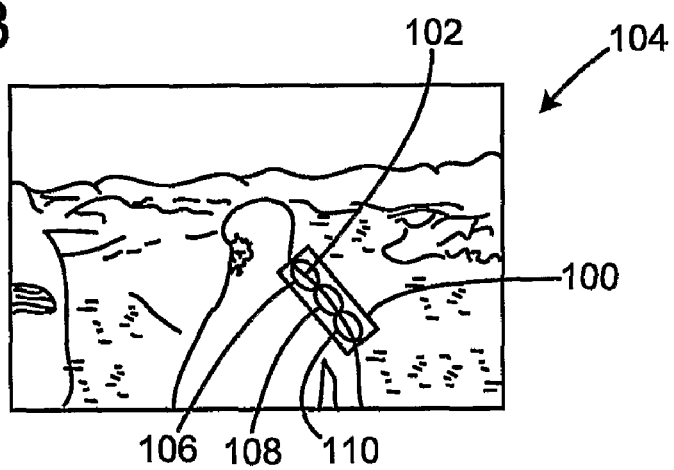
FIG. 3 is an example of an image with the non-edge pixel values removed.

With reference to FIGS. 1-3, the present invention provides a method 10 for indexing each image to make it possible to recognize and retrieve the image and its content. The images may be any type of image, such as a photograph in color or black-and-white, which has a motif and a background. Each motif has edges that distinguish the motif from the background. The background may also have motifs that have distinct edges. An edge in a picture may separate two areas such as an area with a pattern from an area with a homogeneous color. The picture may be a matrix that is built up by pixels that are based on the base colors red, green and blue. The method of the present invention considers changes around the edges of the motif of the image and to find areas of the image that are unique to the image. Because the images that are indexed are based on the content of the images, it is possible to index the pictures so that they can later be found in a search. The method of the present invention does not require any particular handling of the images before or after the images have been indexed.

In a first review step 12, a copy 16 of the image 14 is made and each pixel of the copy 16 is reviewed. In a conversion step 18, a first pixel 20 of the image 14 is converted to a gray scale regardless whether the copy is colored or gray. An illustrative example of a conversion between CIE XYZ to RGB is shown below:

$$\begin{bmatrix} R_{709} \\ G_{709} \\ B_{709} \end{bmatrix} = \begin{bmatrix} 3.240479 & -1.537150 & -0.498535 \\ -0.969256 & 1.875992 & 0.041556 \\ 0.055648 & -0.204043 & 1.057311 \end{bmatrix} \begin{bmatrix} X \\ Y \\ Z \end{bmatrix}$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} * \begin{bmatrix} R \\ G \\ B \end{bmatrix}$$

$$Y = (0.21267 * T) + (0.7151 * G) + (0.072169 * B)$$

For example, the first pixel is converted in the conversion unit 18 to a gray-scaled pixel 24 of a converted copy 16 that has the corresponding intensity. If the value for red, blue and green is the same, the system may determine that the image is black and white. It is possible to use the intensity of the green component of the pixel as the gray pixel value. The method continues reviewing the pixels until all pixels have been reviewed and converted to gray scale pixels 28.

The method may first identify a first pixel value 32 of the first pixel 24, a second pixel value 34 of a second pixel 36 and a third value 38 of a third pixel 40 and so on until all pixels have been identified. The first pixel 24 may be used as a reference pixel 42 so that all other pixels are compared to the reference pixel 42. The second pixel 34 is then analyzed and compared to all the other pixels 28 of the image 16.

The difference between black and white may constitute a 100% contrast. Any other comparison difference will have a value between 0 and 100%. The method of the present invention is mostly focused on the large differences because that may indicate there is an edge pixel. Also, there may be shadows around objects that may generate great difference in values. The lowest differences are likely in areas of solid or similar colors.

In a determining step 44, the method determines a first difference 46 between the first pixel value 32 and the second pixel value 36 and a second difference 48 between the second pixel value 36 and the third pixel value 40. This process may continue until all pixel values have been compared to every pixel value of the image to arrive at dynamic threshold values that could include a local minimum of the number of occurrences of each difference. The calculation of the dynamic threshold values may be calculated as follows:

$$b'(n, m) = \sum_i \sum_j k(i, j) \cdot u(b(n, m) - b(n + i, m + j) -$$

$$t(i, j)), (i, j) \text{ from the neighborhood}$$

$$u(z) = \begin{cases} 0, & z < 0 \\ 1, & z \geq 0 \end{cases}.$$

More particularly, in a comparing step 50, the method compares the first difference 46 with the second difference 48 and all other differences between the pixels of the entire copy 16. When all the pixel differences have been compared to every other pixel difference of the copy 16, a distribution 30 may be developed, as shown in a graph 60 in FIG. 2, where the y-axis represents the number of occurrences of the pixel differences and the x-axis represents the amount of pixel difference. When the pixel difference is zero, the distribution curve 52 has a value on the y-axis and when the pixel difference is great, the curve 52 has a value further to the right of the y-axis. As shown in graph 60, the greatest number of occurrences is for pixels with no difference i.e. the pixels have the same pixel value or grayness.

With reference to FIG. 1, in an identification step 54, the method finds or identifies a difference 62 that is located at a first local minimum 64 of the curve or line 52. In a selection step 56, the method selects all pixel value differences that are located to the right of the pixel difference 62 at the local minimum 64, as illustrated by the line 58 in FIG. 2. In other words, the edge pixels that form edge elements of the image are identified by identifying the areas where the differences are greater than the dynamic threshold difference 62, as shown in the graph 60.

In a removing step 66, pixels that do not form edge elements are removed so that all pixels that are represented by pixel differences to the left of the local minimum 64 are removed. In this way, all areas that are not considered edge pixels are displayed in white and all edge pixels are displayed in black color so that the image by look like the picture in FIG. 3.

Edge pixels that are next to one another are part of the same edge line. The next step of an analysis step 68 is to determine where an edge begins and ends. The edges are converted to vectors to determine how long an edge is held together as the same edge. Statistical areas of an edge line are selected from which statistical data can be obtained so that the next time the same image is to be retrieved, the statistical area can be used for retrieval. By selecting statistical areas, as opposed to identifying where the edge pixels are located relative to the whole image, it is possible to cut a piece off the image and still be able to identify the image as long as the statistical area is displayed. The relative positions between different statistical areas of the edges are analyzed. For example, a statistical area could be the area 100 along an edge line 102 of the image 104, as shown in FIG. 3. The pixels of the area 100 may be vectorized to determine how long or big the area 100 is and where it is located. For example, Delaunay triangulation may be used. The direction of the selected area 100 of the line 102 may be described with vectorization. For example, on each vector three measuring areas are created to analyze the areas around the line 102 to be used in an indexing step 70 of the image analyzed. Vectors that are too small or short are discarded. As indicated above, it is irrelevant whether the image has been enlarged or reduced because the method is only interested in the relative positions of the statistical areas along the edges. Because the size and position of the measuring area are related to the edge elements of the image the same area will always be analyzed even if the image is changed by cutting portions from the image or by enlarging or reducing the size of the image. Each measuring area must have a minimum number of pixels that can be measured. The allowable minimum partly depends upon the number of strata that is selected and how big the total amount of pixels is in each area that is selected. The area is divided into strata to make it possible to make direction comparisons between different areas with different sizes. An example of using strata as a selection method is shown below:

$$\hat{\mu}(y) = \sum_{b=1}^{H} \frac{N_b}{N} * \overline{y_b}$$

$N$ = populationen $N_b$ = stratumpopulationen $\overline{y_b}$ = stratumedelvarde $$V[\hat{\mu}(y)] = \sum_{b=1}^{H} \left(\frac{N_b}{N}\right)^2 * \frac{\sigma_b^2(y)}{n_b} * \left(1 - \frac{n_b}{N_b}\right) - \sum_{b=1}^{H} \left(\frac{N_b}{N}\right)^2 * \sigma_b^2(y) * \left(\frac{1}{n_b} - \frac{1}{N_b}\right)$$

$$\sigma_b^2(b) = \frac{1}{N_b - 1} \sum [y_j - \mu_b(v)]^2$$

$$\sigma(y, x) = \frac{1}{N - 1} \sum [v_j - \mu(y)][x_i - \mu(x)]$$

For example the area 100 of the line 102 may include stratum areas 106, 108 and 110. The stratum areas can be used to later identify and retrieve the same image. Statistical data is used to so that average values and variances of two different areas may be compared. However, the population of the pixels measured in each measuring area may be different so that strata are preferably used as a selection method to handle the difference in number of pixels. In this way, average values may be used although different populations of pixels are used such as when different image resolutions are used. Other selection methods may also be used.

The histogram or the pixel distribution is indexed and saved in a database 74 according to a storing step 72. Some of the histograms are particularly interesting because they are unique to the particular image while other histograms are similar to most other images. The searching of the database may be to identify images that are similar to a certain image. It may also be possible to search for images that are different from the reference image particularly if most of the images in the database are similar. In order to find an indexed similar image in the database, it is necessary to conduct the same analysis, as the steps described above, of the new image. The average values of the strata and variances of the new image are primarily compared to images in the database. If this is not sufficient, the method may carry out a co-variance analysis of the images. In this way, the search will yield a search result of images that are substantially similar to the new image. This means that certain variations of the images in the database are permitted.

Many of the steps of the method are independent of the result of the previous calculations so that it is possible to carry out many simultaneous calculations of histograms and statistics.

While the present invention has been described in accordance with preferred compositions and embodiments, it is to be understood that certain substitutions and alterations may be made thereto without departing from the spirit and scope of the following claims.

The invention claimed is:

1. A method of recognizing and indexing a digital image, comprising:
   converting the digital image to an image;
   comparing each pixel of the digital image with each pixel's local neighborhood of the digital image;

identifying a first pixel value of a first pixel, a second pixel value of a second pixel, and a third pixel value of a third pixel;

determining i) a first difference value between the first pixel value and the second pixel value and ii) a second difference value between the second pixel value and the third pixel value;

comparing the first difference value with the second difference value;

determining a number of occurrences of each pixel difference value;

identifying a threshold difference corresponding to a dynamic threshold value of the number of occurrences, wherein the dynamic threshold value of the number of occurrences of each pixel pair difference is selected as a first local minimum occurring in a histogram graph of number of occurrences for each difference value; and determining that each difference being greater than the threshold difference is an edge pixel.

2. The method according to claim 1 wherein the method further comprises:

identifying i) the first pixel value of the first pixel and the first pixel's neighborhood, ii) the second pixel value of the second pixel and the second pixel's neighborhood, and iii) the third pixel value of the third pixel and the third pixel's neighborhood, determining i) the first difference between the first pixel value and the first pixel's neighborhood in different directions and the second pixel value and the second pixel's neighborhood in different directions and ii) the second difference between the second pixel value in the second pixel's neighborhood and the third pixel value in the third pixel's neighborhood in different directions, and removing all pixels from the digital image that are related to pixel differences that are smaller than a local minimum difference.

3. The method according to claim 1 wherein the method further comprises developing a graph showing the number of occurrences of each pixel difference to identify the local minimum.

4. The method according to claim 1 wherein the method further comprises selecting a number of edge pixels and vectorizing portions of the edge pixels along an edge line.

5. The method according to claim 4 wherein the method further comprises identifying statistical areas along the edge line.

6. The method according to claim 5 wherein the method further comprises storing the statistical areas in a database.

7. The method according to claim 6 wherein the method further comprises indexing the digital image by using the statistical areas.

8. The method according to claim 6 wherein the method further comprises retrieving the digital image by search for statistical areas in the database.

9. The method according to claim 1 wherein the method further comprises identifying a local minimum difference associated with a local minimum of the number of occurrences.

10. A method of recognizing and indexing a digital image, comprising:

converting the digital image to an image;

comparing neighbouring each pixel pair in the image and calculating an intensity difference each pixel pair by comparing each pixel of the digital image with each pixel's local neighborhood of the digital image;

identifying a first pixel value of a first pixel, a second pixel value of a second pixel, and a third pixel value of a third pixel;

determining i) a first difference value between the first pixel value and the second pixel value and ii) a second difference value between the second pixel value and the third pixel value;

comparing the first difference value with the second difference value;

determining a number of occurrences of each pixel difference value;

after each neighbouring pixel pair has been compared in the image and the intensity difference between each pixel pair has been calculated, establishing a histogram graph of a number of occurrences for each difference value;

identifying a threshold difference corresponding to a dynamic threshold value of the number of occurrences, wherein the dynamic threshold value of the number of occurrences of each pixel pair difference is selected from a first local minimum occurring in the histogram graph of the number of occurrences for each difference value; and determining that each difference being greater than the threshold difference is an edge pixel.

11. A method of recognizing and indexing a digital image, comprising:

converting the digital image to an image comprised of a motif having a pattern and an edge and a background of a homogeneous color, wherein the edge separates the motif from the background;

comparing neighbouring each pixel pair in the image and calculating an intensity difference each pixel pair by comparing each pixel of the digital image with each pixel's local neighborhood of the digital image;

identifying a first pixel value of a first pixel, a second pixel value of a second pixel, and a third pixel value of a third pixel;

determining i) a first difference value between the first pixel value and the second pixel value and ii) a second difference value between the second pixel value and the third pixel value;

comparing the first difference value with the second difference value;

determining a number of occurrences of each pixel difference value;

after each neighbouring pixel pair has been compared in the image and the intensity difference between each pixel pair has been calculated, establishing a histogram graph of a number of occurrences for each difference value;

identifying a threshold difference corresponding to a dynamic threshold value of the number of occurrences, wherein the dynamic threshold value of the number of occurrences of each pixel pair difference is selected from a first local minimum occurring in the histogram graph of the number of occurrences for each difference value; and determining that each difference being greater than the threshold difference is an edge pixel of the motif, adjacent edge pixels defining an edge line of the motif.

* * * * *